US012632808B2

(12) United States Patent   (10) Patent No.: US 12,632,808 B2
Thakur et al.   (45) Date of Patent: May 19, 2026

(54) CONVERSATIONAL ARTIFICIAL INTELLIGENCE SERVICE AND CHAT ASSISTANT FOR PERSONALIZED ENTITY ONBOARDING WITH DIGITAL PLATFORMS

(71) Applicant: PAYPAL, INC., San Jose, CA (US)

(72) Inventors: Bhartendu Thakur, Chennai (IN); Srikant Jayaraman, Pune (IN); Divya Vinothkumar, Chennai (IN)

(73) Assignee: PAYPAL, INC., San Jose, CA (US)

( * ) Notice: Subject to any disclaimer, the term of this patent is extended or adjusted under 35 U.S.C. 154(b) by 186 days.

(21) Appl. No.: 18/394,579

(22) Filed: Dec. 22, 2023

(65) Prior Publication Data

US 2025/0209396 A1   Jun. 26, 2025

(51) Int. Cl.
*G06Q 10/00*   (2026.01)
*G06F 40/40*   (2020.01)
*G06Q 10/0631*   (2023.01)

(52) U.S. Cl.
CPC ....... *G06Q 10/06315* (2013.01); *G06F 40/40* (2020.01); *G06Q 10/063112* (2013.01)

(58) Field of Classification Search
None
See application file for complete search history.

(56) References Cited

U.S. PATENT DOCUMENTS

2019/0012714 A1* 1/2019 Bright ................ G06F 11/3438
2020/0310888 A1* 10/2020 Gopalan ................ G06F 21/31

2020/0410556 A1   12/2020 Kulkarni et al.
2021/0117893 A1   4/2021 Sohum et al.
2021/0165697 A1*   6/2021 Gopalan ................... G06F 8/36
2021/0209682 A1*   7/2021 Jain ........................ H04L 9/0637
2021/0224336 A1*   7/2021 Bright ................. G06F 11/3438
2021/0264372 A1*   8/2021 Asseer ............... G06Q 10/1053
2023/0199119 A1*   6/2023 Bohannon ............... H04L 51/08
379/265.09

(Continued)

OTHER PUBLICATIONS

Flynn, Shannon, How to Create and Implement an Onboarding Chatbot, Nov. 29, 2022, Landbot, https://landbot.io/blog/onboarding-chatbot-guide, p. 1-5. (Year: 2022).*

*Primary Examiner* — Joseph M Waesco

(74) *Attorney, Agent, or Firm* — Haynes and Boone, LLP

(57) ABSTRACT

There are provided systems and methods for streamlined and privacy protected data flows for entity onboarding with online data platforms. An online transaction processor or other service provider may provide computing services and platforms to entities including merchants for electronic transaction processing and other account services. To onboard entities with the transaction processor, the transaction processor may provide a merchant or user-specific experience and recommendations using a conversational AI service and chatbot. An AI engine may be trained to engage with users via chat dialogue, which may interact with users during onboarding and/or account lifecycle events based on the available services and products of the service provider. An intent of the entity may be classified by the AI engine and may be used to generate a recommendation including an action plan or the like of activities or steps for the entity to take.

20 Claims, 9 Drawing Sheets

(56)　　　　　　References Cited

U.S. PATENT DOCUMENTS

| 2023/0205797 | A1* | 6/2023 | Das | G06F 16/90332 |
| | | | | 704/9 |
| 2024/0338661 | A1* | 10/2024 | Duggal | G06Q 10/1053 |
| 2024/0340375 | A1* | 10/2024 | Sposato | G10L 15/26 |
| 2024/0403367 | A1* | 12/2024 | Dressler, II | G06F 40/35 |
| 2025/0111309 | A1* | 4/2025 | Hudson | G06Q 10/06315 |
| 2025/0190623 | A1* | 6/2025 | Sreenidurai | H04L 63/04 |

* cited by examiner

300c

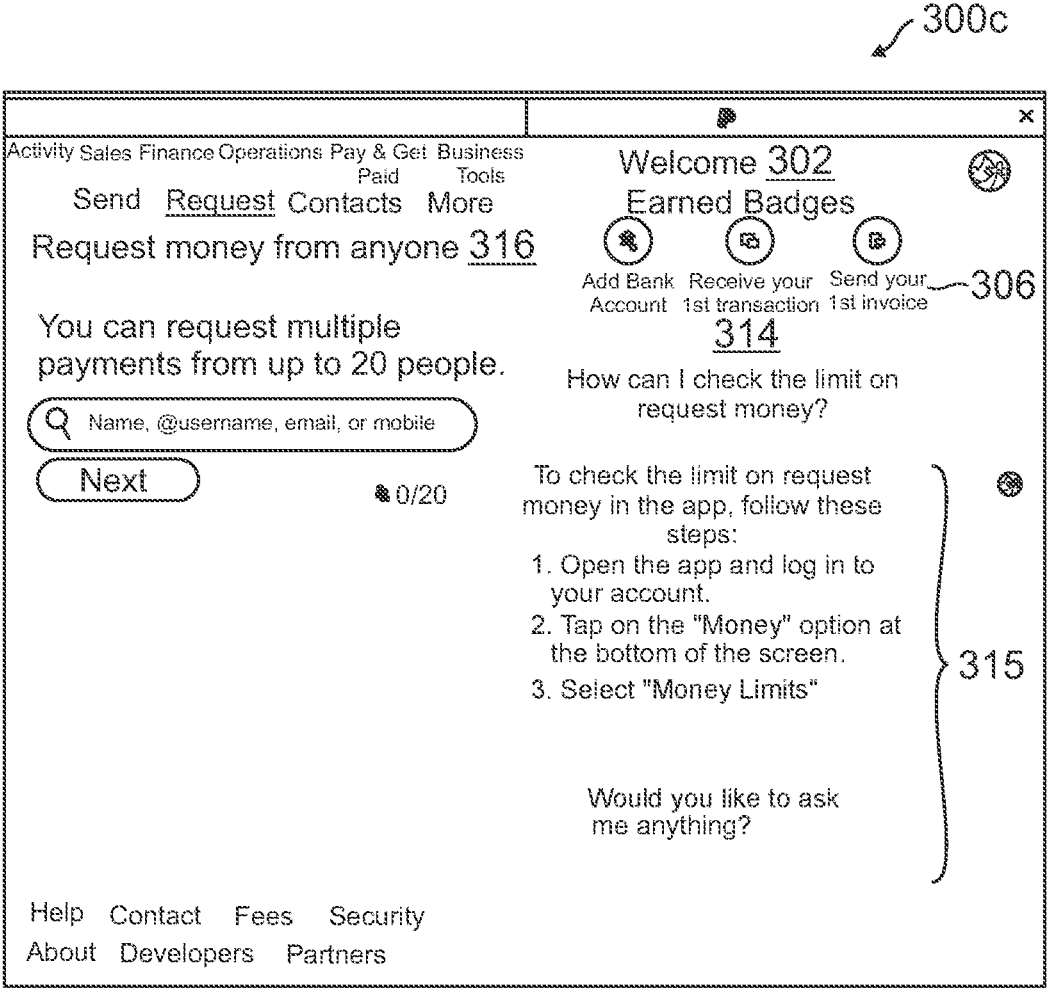

Activity Sales Finance Operations Pay & Get Business
                                Paid    Tools
    Send   Request Contacts   More Request money from anyone 316

You can request multiple
payments from up to 20 people.

Q  Name, @username, email, or mobile

Next                          ＆0/20

Welcome 302
Earned Badges

Add Bank  Receive your  Send your — 306
Account  1st transaction  1st invoice

314

How can I check the limit on
request money?

To check the limit on request
money in the app, follow these
steps:
1. Open the app and log in to
   your account.
2. Tap on the "Money" option at
   the bottom of the screen.
3. Select "Money Limits"               315

Would you like to ask
me anything?

Help   Contact   Fees   Security
About  Developers  Partners

FIG. 3C

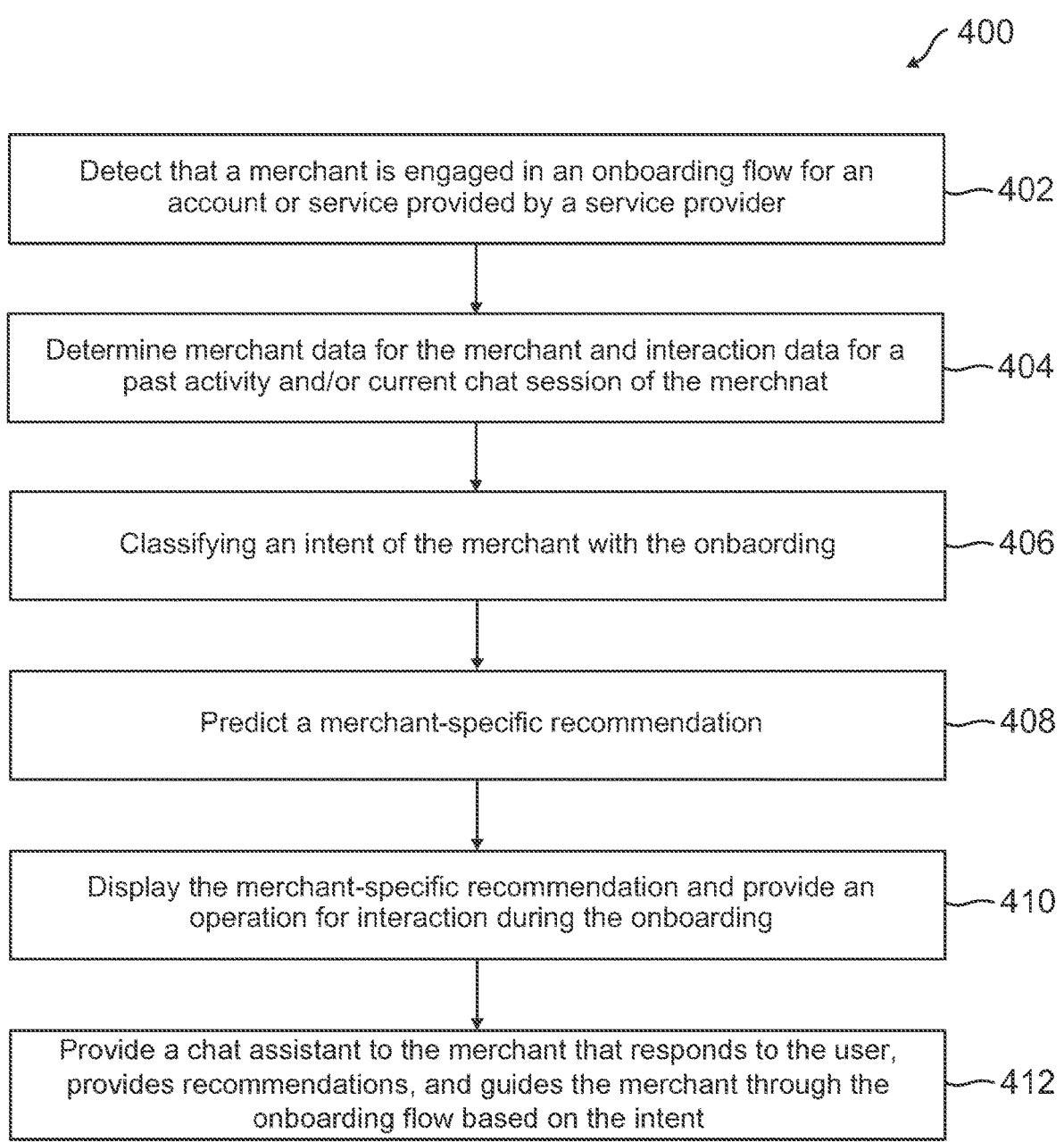

400

Detect that a merchant is engaged in an onboarding flow for an account or service provided by a service provider ⌐402

Determine merchant data for the merchant and interaction data for a past activity and/or current chat session of the merchnat ⌐404

Classifying an intent of the merchant with the onbaording ⌐406

Predict a merchant-specific recommendation ⌐408

Display the merchant-specific recommendation and provide an operation for interaction during the onboarding ⌐410

Provide a chat assistant to the merchant that responds to the user, provides recommendations, and guides the merchant through the onboarding flow based on the intent ⌐412

FIG. 4

CONVERSATIONAL ARTIFICIAL INTELLIGENCE SERVICE AND CHAT ASSISTANT FOR PERSONALIZED ENTITY ONBOARDING WITH DIGITAL PLATFORMS

TECHNICAL FIELD

The present application generally relates to data privacy and security when utilizing online platforms, and more particularly to providing streamlined and privacy protected data flows to onboard entities with an online data service provider and their platforms.

BACKGROUND

Online service providers may offer various services to end users, merchants, and other entities. This may include providing electronic transaction processing data flows, services, and other computing resources. Further, the service provider may provide and/or facilitate the use of online merchant marketplaces and/or transaction processing between different entities. However, establishment and use of these digital services require merchants and other entities to onboard with the service providers. During onboarding operations, services may not be streamlined and/or protected to prevent data leaks and/or cause unnecessary data input and/or processing operations. The difficulties of properly onboarding such merchants and other entities may lead to loss of customer reliance, data security issues, and/or attrition. Thus, there is a need to provide a more streamlined, faster, and more secure process to onboard digital data and services for merchants with an online merchant marketplace platform.

BRIEF DESCRIPTION OF THE DRAWINGS

FIGS. 3A-3E are exemplary user interfaces for a conversational AI and chat assistant that provides personalized recommendations to merchants during account onboarding and lifecycle events, according to various embodiments;

FIG. 4 is a flowchart for a conversational AI service and chat assistant for personalized entity onboarding with digital platforms, according to an embodiment.

Figure 1:
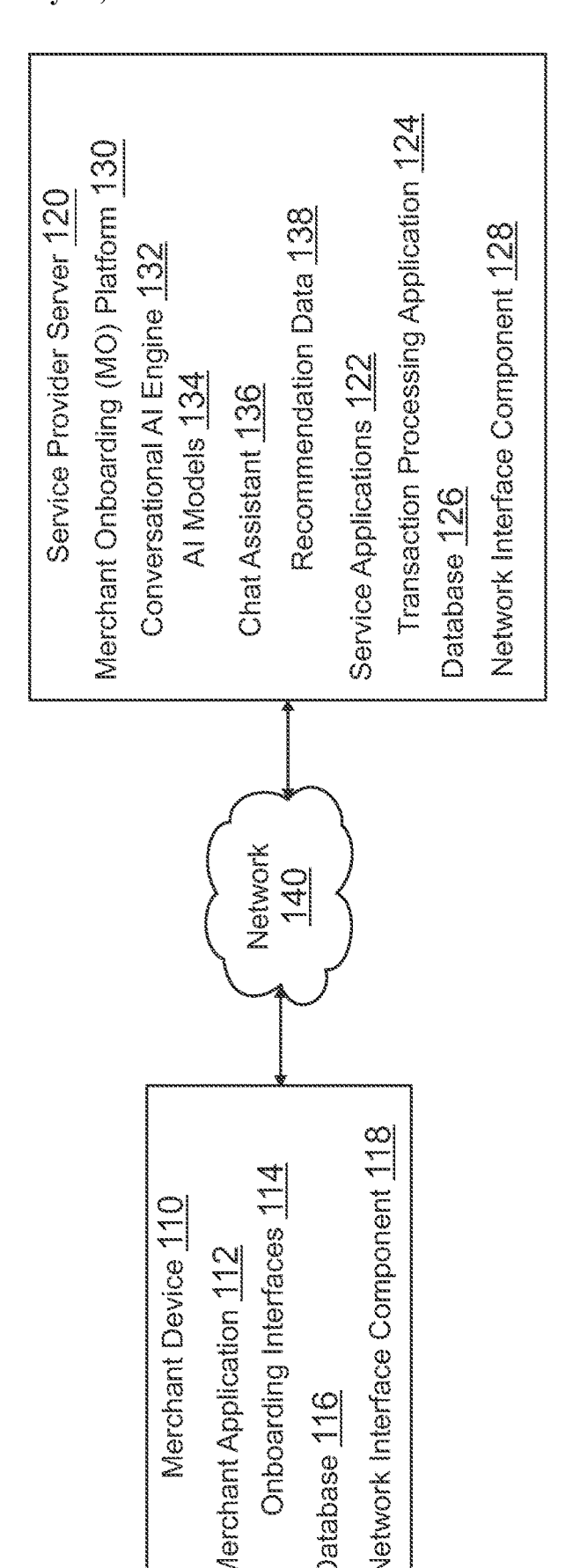
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for a conversational AI service and chat assistant for personalized entity onboarding with digital platforms. Systems suitable for practicing methods of the present disclosure are also provided.

A user may wish to process a transaction, such as for a payment to another user or a transfer, through an online service provider. The user may pay for one or more transactions using a digital wallet or other account with the online service provider or transaction processor (e.g., PayPal®). In order for merchants to provide services for users to engage in these processes and interactions for processing transactions with the merchants, the service provider may provide operations for merchants to onboard and setup merchant payment accounts and transaction processing operations and procedures through one or more merchant websites, systems, applications, devices, and the like. However, onboarding may be cumbersome and time consuming, without detailed or personalized instructions, resulting in computing service usage after onboarding that may not be transparent and engaging.

For example, when accessing online platforms and utilizing the corresponding computing resources of a service provider, such as the aforementioned transaction processor, merchants may onboard with the service provider to obtain access to accounts and computing services and utilize corresponding services during the course of business or other interactions with customers, clients, and/or entities. The merchant onboarding experience is often a time consuming and difficult process requiring many data inputs, uploads, computing service setups (including software development kit (SDK) usage and setup), application and/or website setup and configuration, and the like. Thus, there are many valid reasons for merchants to drop off from a service provider's onboarding platform, account setup, and/or computing service usage. Further, merchants may utilize incorrect computing services or may not engage with computing services that may be valuable and beneficial to the merchant. Gaps from integration, complex workflows, and processes that create tension and friction with onboarding of accounts and services may lead to loss of merchant onboarding and/or poor user experiences (UXs) of the merchants.

Generally, many different difficulties may arise during onboarding. First, there may be an unfriendly merchant experience. For example, recommended actions, pathways, and/or flows for maximum benefit and/or efficient onboarding are not always clear and not specific to the merchant or other entity. The service provider may want to provide an in-context experience with a latest SDK implementation, which may not provide operations and redirects for interface-specific and/or tightly controlled interface elements, such as interface buttons that may be controlled by specific data processing policies and operations. Further, the service provider may be requesting too large of an amount of information that may be unnecessary for onboarding compliance, including exposure of sensitive data that is not needed for onboarding. Additionally, complexities may arise during onboarding of merchants including cluttered or overwhelming options and interfaces, confusion about integration(s) that should be used by specific merchants and/or requirements for computing services, and/or lack of personalized recommendations and/or identification of actions for merchants to take that may enhance either business and/or create more efficient or optimized use of the service provider by the merchant during or after onboarding. This may require a personal assistant or manager to assist the merchant or other entity during the onboarding process.

In various embodiments, an online transaction processor or other service provider may make the merchant experience onboarding more friendly, efficient, and personalized, with unnecessary exposure of sensitive data, using a conversational AI engine and model(s) with an intelligent chat assistant. For example, the service provider may provide resources for onboarding based on a determined recommendation for a computing service or other product offered by the service provider to the merchant through the account. In this regard, a conversational AI engine and system may include one or more AI models, such as machine learning (ML) models, neural networks (NNs), or the like, to converse with merchants or other users associated with entities and determine a personalized and recommended experience and recommendation of computing services to utilize based on what may be beneficial and/or incentivize the merchant or entity to utilize the recommended service and/or complete a task associated with the service. These may include large language models (LLMs) and/or generative AIs for chatbots, such as generative pretrained transformers (GPTs) including ChatGPT™.

Training of the conversational AI may be performed using background data for the service provider and/or merchants of the service provider, such as the available computing services and/or products of the service provider, onboarding success and/or use of the computing services. Further, past onboarding experiences, experience feedback, and/or use or engagement with computing services, products, and the like of the service provider by merchants during or after onboarding may be used for training data. During training of a conversational AI model, the model may be trained to make predictions and recommendations, as well as other guidance, for a merchant or other entity when onboarding. These recommendations may be to boost a merchant's profile, provide useful or desirable products and services to the merchant, increase the merchant's retention and/or reduce churn rate, increase the merchant's interest or activity, or otherwise appeal to the merchant and incentivize the merchant to use the service provider and/or account features and computing services. In this regard, the conversational AI model may include and/or be connected with one or more LLMs and/or generative pretrained transformers, which may provide generative AI services and interactions for an automated chat assistant.

Once trained, the conversational AI may be deployed to process activities events, input, and/or communications by merchants during the onboarding process to provide intelligent recommendations of computing services or other products, as well as courses of action for merchants to take based on predicted benefits, interests, and incentivization for the merchant during onboarding. Further, the traditional approach to merchant onboarding does not consider a particular journey of the merchant when onboarding with the merchant and their intent when onboarding and/or conversing with chatbots and in other assistance channels. The merchant's "journey" may be described as the path of interactions by the merchant with the service provider and the service provider's products and/or services when onboarding or performing another task with the service provider. As such, a journey may be one or more past events, inputs, or activities engaged in by the merchant in associating with onboarding with the service provider and/or using computing services provided by the service provider. Similarly, their intent may described a desired result, outcome, or course of action that the merchant would like to engage in and/or have as a result of additional activities the merchant performs during onboarding. This may be a result of the journey of the merchant and additional inputs or activities taken by the merchant at the current time.

Thus, when a merchant begins, returns to, and/or performs an onboarding process, whether for a new or existing merchant account and/or with a new computing service for use, the service provider may utilize the conversational AI system to provide a personalized onboarding experience to the merchant. For example, the merchant may perform an onboarding of a merchant account to register such account and/or register for use of a computing service (e.g., transaction processing or payment service) offered by the service provider. This experience may include different user interfaces, portals, and/or web-based or device-side software applications, which may also include chat interfaces and chat-based communications with an automated chat assistant, such as a chatbot of the conversational AI system. Using one or more models and LLMs for conversational outputs, the conversational AI system may detect activity and/or actions being taken or previously performed by the merchant (or similar merchants, e.g., other merchants in the same or similar industry, size, revenue, location(s), customer base, etc., which can be used for a first time merchant or a return merchant) in association with the onboarding, which may include chat communications, queries, responses, and the like with the chat assistant, and may intelligently determine a merchant-specific recommendation for the merchant. This may correspond to an additional activity to perform in association with the onboarding, such as an account verification to take, account data to provide, a computing service to use or enroll in, and the like. Chat assistance and guidance in use of and/or engagement in this activity may be provided via the chat assistant using the conversational AI and/or LLMs that allow conversing in an automated but human-like manner with the merchant.

In some embodiments, the recommendation may be based on at least one of a sentiment analysis from chat conversations, communications, and/or dialogue by the merchant with the chat assistant or another agent of the service provider. Sentiment analysis may be provided by a natural language processor (NLP) of the conversational AI system and may determine sentiment of the merchant based on the words, phrases, and the like from communications by the merchant. An entity recognition may be performed with the merchant to identify the merchant entity and merchant data or the like for the merchant, which may allow for determination of the merchant's business, industry, preferences, interests, potential incentivizing factors, and the like. Using the aforementioned data, the conversational AI system may make an intent classification of the merchant's intent in performing specific activities, engaging in the onboarding, and/or conversing with the chat assistant. The intent may be used as input for determination of the recommendation, which may further be specific to the merchant and/or merchant's industry, or more general to the merchant's onboarding experience.

Further, to incentivize the merchant to engage with the onboarding process and/or the merchant-specific recommendation, the conversational AI engine may provide badges that indicate and/or are rewarded for progress toward meeting a goal, performing the recommended activity, or the like. For example, badges may indicate how far or how much a merchant has performed a task or activity that was recommended, and a progress toward completion. The badges may also be rewarded and/or completed when the activity is completed, such that the merchant's account and/or profile may be used to display such badge(s). The conversational AI system may display the badges and/or progress toward badge completion via a user interface during the onboarding process, and the badges selected to be displayed may be intelligently selected based on the merchant's intent or other information that may customize incentivizes for merchant to complete the badges and/or another task or activity toward badge completion and/or performance of a recommended activity. As such, the conversational AI system may provide a more convenient and personalized digital and automated assistant when merchants or other entities interact with a service provider's digital platforms, for example, to facilitate use of and engagement with computing services and digital accounts. This allows for coordinated communications to merchants or other entities that are optimized to provide efficient data processing of onboarding jobs and tasks.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, a mobile OS (e.g., iOS, Android, Google OS, etc.), a merchant and/or point-of-sale (POS) device OS, or another suitable device and/or server-based OS. It can be appreciated that the devices and/or servers illustrated in FIG. 1 may be deployed in other ways and that the operations performed, and/or the services provided by such devices and/or servers may be combined or separated and may be performed by a greater number or fewer number of devices and/or servers. One or more devices and/or servers may be operated and/or maintained by the same or different entity.

System 100 includes a merchant device 110 and a service provider server 120 in communication over a network 140. Merchant device 110 may be utilized by a merchant or other user to receive communications over network 140, where service provider server 120 may provide various data, operations, and other functions over network 140 to provide services to merchants, users, and computing devices. In this regard, merchant device 110 may be used to onboard with service provider server 120. Service provider server 120 may provide streamlined and personalized operations for onboarding interfaces, operations, and conversational AI chat experiences, as discussed herein.

Merchant device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Merchant device 110 may be implemented as a communication device that may utilize appropriate hardware and software configured for wired and/or wireless communication with service provider server 120. For example, in one embodiment, merchant device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Merchant device 110 of FIG. 1 includes and/or is associated with a merchant application 112, a database 116, and a network interface component 118, implementations of which are discussed further below. The merchant application 112 may correspond to executable processes, procedures, and/or applications with associated hardware. In other embodiments, merchant device 110 may include additional or different modules having specialized hardware and/or software as required.

Merchant application 112 may correspond to one or more processes to execute software modules and associated components of merchant device 110 to provide features, services, and other operations by a merchant for consumers over network 140, which may include merchant sales operations, POS device processing and/or operations, online merchant marketplaces, sales and inventory services, and the like. Further, merchant application 112 may enable requesting and onboarding with service provider server 120 for use of a merchant account, payment and/or electronic transaction processing services, and other computing services provided through onboarding interfaces 114. In some embodiments, this may further include processes for merchant sales, inventory, return or exchange, risk analysis, and other services a merchant may require during the course of their business and sales. In this regard, merchant application 112 may correspond to specialized software utilized by a merchant or other user of merchant device 110 that may provide applications and application data based on the account and/or computing services enabled by service provider server 120 after merchant onboarding. Merchant application 112 may provide and/or process items for sale with merchant device 110 and/or a user interacting with merchant device 110 (e.g., using a POS device, the website, mobile application, or another merchant marketplace platform. In certain examples, merchant application 112 may be accessible over the Internet and provide for sales with merchant device 110 over network 140.

In some embodiments, merchant application 112 may correspond to and/or be used to configure a checkout application at a physical merchant location, such as the application(s) of a point-of-sale (POS) device used to provide sales at physical locations. For example, merchant application 112 may be used to establish a transaction once a user/employee associated with merchant device 110 has selected one or more items for purchase and/or entered the item(s) to the transaction for processing. Once a payment amount is determined for the item(s) to be purchased by the user, merchant application 112 may request payment for the transaction. Payment may be provided using electronic transaction processing services enabled and/or provided by service provider server 120 after merchant onboarding using the conversational AI and personalized experience discussed herein. In this regard, payment may be received from a user and may be processed using service provider server 120. After receipt of payment and/or confirmation of the payment, merchant application 112 may then process a payment to the merchant associated with merchant device 110.

In some embodiments, merchant device 110 may be used to host, provide, and/or access and maintain a website of the merchant, a web-based application, or the like, which may also be configured based on computing services provided by service provider server 120. The website may be operated, hosted, updated, and provided to end user devices and other systems or servers. The website may correspond to a hosted website having webpages that may include parent and child webpages where customers and service providers may browse items and other services provided by a corresponding merchant, engage in electronic transaction processing, provide customer support and feedback, and the like. The website may be provided through one or more webpages having of Hypertext Markup Language (HTML) code, Extensible Markup Language (XML) code, JavaScript code, or Cascading Style Sheets (CSS). Website data for the website may be configured during or after onboarding of the corresponding merchant with service provider server 120, for example, using installed and/or configured SDKs and SDK operations, APIs and endpoints, and the like.

In this regard, service provider server 120 may streamline onboarding operations, such as by providing website capabilities and website layouts during a streamlined onboarding experience in onboarding interfaces 114 for the merchant to utilize services provided by service provider server 120 on or with the website. The website may further be updated when or after the merchant is onboarded in order to provide capabilities of service provider server 120 with the website (e.g., payment functionalities, as well as other integrated operations and/or SDKs). In other embodiments, the merchant may instead provide a merchant application to end users similarly configured using computing services, SDKs and SDK operations, APIs and endpoints, and the like provided by service provider server 120, which may be utilized when or after onboarding of the merchant with service provider server 120 through onboarding interfaces 114 and the like.

Merchant application 112 may correspond to a general browser application and/or general, native, or local mobile application configured to retrieve, present, and communicate information over the Internet (e.g., utilize resources on the World Wide Web) or a private network. For example, merchant application 112 may provide a web browser, which may send and receive information over network 140, including retrieving website information (e.g., a website for an email provider or other messaging service), presenting the website information to the user, and/or communicating information to the website. Merchant application 112 may include a dedicated application provided by service provider server 120 or other entity (e.g., an email provider or messaging service), as well as services and/or online digital platforms hosted by such entities. Merchant application 112 may be associated with digital payment accounts, account information, user financial information, and/or transaction histories, which may be associated with electronic transaction processing services provided by service provider server 120 for merchants.

To onboard and utilize accounts and computing services of service provider server 120, merchant device 110 may access data for and present, such as from service provider server 120, onboarding interfaces 114. Onboarding interfaces 114 may correspond to one or more user interfaces, presented via a web browser and website or a software application, having a personalized onboarding experience with merchant-specific recommendations based on a merchant intent of the merchant corresponding to merchant device 110 with the onboarding process and use of service provider server 120. Onboarding interfaces 114 may further include and/or display chat interfaces for a conversational AI and/or chatbot, which may provide customized and personalized responses to a user. In some embodiments, onboarding interfaces 114 may also present user-specific awards, badges, earned rewards, and the like that may incentivize users to perform or complete tasks associated with a personalized onboarding and/or action plan determined or predicted for the user/merchant based on the user/merchant intent.

Merchant device 110 may further include or have access to a database 116, which may correspond to different types of data storage and components including cloud computing storage nodes, remote data stores and database systems, distributed database systems over network 140, and the like used to store various applications and data. Database 116 may include, for example, identifiers such as operating system registry entries, cookies associated with merchant application 112 and/or other applications, identifiers associated with hardware of merchant device 110, or other appropriate identifiers, such as identifiers used for payment/user/device authentication or identification, which may be communicated as identifying the user/merchant device 110 to service provider server 120.

Merchant device 110 includes at least one network interface component 118 adapted to communicate with service provider server 120 and/or other devices and servers. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide computing services and operations via one or more digital platforms, applications, websites, and the like. Service provider server 120 may provide computing services to various entities, which may require onboarding for account and service usage. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes and/or is associated with a merchant onboarding (MO) platform 130, service applications 122, a database 126, and a network interface component 128, implementations of which are discussed further below. MO platform 130 and service applications 122 may correspond to executable processes, procedures, and/or applications with associated hardware. In other embodiments, service provider server 120 may include additional or different modules having specialized hardware and/or software as required.

MO platform 130 may correspond to one or more processes to execute modules and associated specialized hardware of service provider server 120 to provide a conversational AI and personalized action plan and/or onboarding experience for onboarding with online data platforms of service provider server 120. In this regard, MO platform 130 may correspond to specialized hardware and/or software used by a merchant or other user associated with merchant device 110 to provide operations during onboarding of a merchant for an account and computing service usage with service provider server 120, as well as maintenance of such accounts and services over time. For example, MO platform 130 may receive a merchant onboarding request in order to enroll in a merchant account and/or access and utilize computing resources provided by service provider server 120. Based on this request, MO platform 130 may provide a conversational AI engine 132 using AI models 134 for a personalized onboarding experience of accounts and/or other computing resources, services, and/or data, as well as a chat assistant 136 to facilitate interactions by the merchant or other user with the onboarding, a personalized action plan, and/or recommendation data 138 on steps for an additional activity to take during onboarding.

As such, recommendation data 138 may include merchant-specific recommendations for the personalize merchant experience and/or chat assistance through conversational AI engine 132. Thereafter, MO platform 130 may process a merchant onboarding for a merchant request, which may include creating and/or processing accounts and account data, providing SDKs and API endpoints for system integrations, determining and awarding badges, rewards, or the like for performance and tasks completed during onboarding, and/or otherwise recommending actions based on a merchant intent with the onboarding processing and request.

For example, it may be determined that a merchant is performing an onboarding for a merchant account, is serving the merchant account by onboarding or using a new or changed computing service or product, or otherwise engaging in account lifecycle maintenance of an account of the merchant with service provider server 120. Based on merchant data and/or past merchant activities associated with the merchant, the onboarding and/or request(s) from the merchant, and the like, MO platform 130 may, for conversational AI engine 132, extract context data associated with the onboarding. For example, feature data may include ML features associated with past activities and/or onboarding requests by different merchants, which may be engineering and/or selected during model training. An intent of the merchant with the onboarding may be classified and/or determined by conversational AI engine 132 based on the context data, such as using AI models 134. This may in turn be used to predict and/or generate recommendation data 138, such as merchant-specific recommendations for a personalized action plan for onboarding the merchant and/or for the merchant to perform during onboarding, which may include additional activities and/or incentives for those activities to provide to the merchant. As such, the merchant-specific recommendations may be output via onboarding interfaces 114 with chat assistant 136, which may include recommendation data 138 displayed via onboarding interfaces 114.

As such, conversational AI engine 132 may train AI models 134 including one or more AI or ML models, NNs, conversational AIs, or the like. AI models 134 may have trained layers based on training data and selected features or variables configured to generate conversation or dialogue with merchants during onboarding. For example, ML features or variables may correspond to individual pieces, properties, characteristics, or other inputs for an ML model and may be used to cause an output by that ML model once the ML model has been trained using data for those features from training data. AI models 134 may be used for computation and calculation of model scores based on layers, nodes, branches, clusters, rules, and the like that are trained and optimized. As such, ML models may be trained to provide a predictive output, such as a score, likelihood, probability, or decision, associated with a particular prediction, classification, or categorization.

For example, AI models 134 may include DNNs, MLs, LLMs, generative AIs, or other AI models trained using training data having data records that have columns or other data representations and stored data values (e.g., in rows for the data tables having feature columns) for the features. When building AI models 134, training data may be used to generate one or more classifiers and provide recommendations, predictions, or other outputs based on those classifications and an ML or NN model algorithm and architecture. The algorithm and architecture for the AI models 134 may correspond to DNNs, ML decision trees and/or clustering, conversational AIs, LLMs, generative AI, and other types of AI, ML, and/or NN architectures. The training data may be used to determine features, such as through feature extraction and feature selection using the input training data.

For example, DNN models may include one or more trained layers, including an input layer, a hidden layer, and an output layer having one or more nodes; however, different layers may also be utilized. As many hidden layers as necessary or appropriate may be utilized, and the hidden layers may include one or more layers used to generate vectors or embeddings used as inputs to other layers and/or models. In some embodiments, each node within a layer may be connected to a node within an adjacent layer, where a set of input values may be used to generate one or more output values or classifications. Within the input layer, each node may correspond to a distinct attribute or input data type for features or variables that may be used for training and intelligent outputs, for example, using feature or attribute extraction with the training data.

Thereafter, the hidden layer(s) may be trained with this data and data attributes, as well as corresponding weights, activation functions, and the like using a DNN algorithm, computation, and/or technique. For example, each of the nodes in the hidden layer generates a representation, which may include a mathematical computation (or algorithm) that produces a value based on the input values of the input nodes. The DNN, ML, or other AI architecture and/or algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node(s) to produce one or more output values for ML models that attempt to classify and/or categorize the input feature data and/or data records. Thus, when the AI models 134 are used to perform a predictive analysis and output, the input data may provide a corresponding output based on the trained classifications.

Layers, branches, clusters, or the like of the AI models 134 may be trained by using training data associated with data records of interest, such as onboarding options, computing services, personalized assistance responses, available rewards or badges for onboarding tasks and goals, and the like. By providing training data, the nodes in the hidden layer may be trained (adjusted) such that an optimal output (e.g., a classification) is produced in the output layer based on the training data. By continuously providing different sets of training data and/or penalizing the AI models 134 when the outputs are incorrect, the AI models 134 (and specifically, the representations of the nodes in the hidden layer) may be trained (adjusted) to improve its performance in data classifications and predictions. Adjusting of the AI models 134 may include adjusting the weights associated with each node in the hidden layer.

Chat assistant 136 may therefore output recommendation data 138 to a merchant or other user via onboarding interfaces 114 and/or other user interfaces presentable via user devices. Recommendation data 138 may include outputs by AI models 134 and may include a merchant-specific recommendation, such as a personalized action plan and/or conversational data, that may prompt or suggest to the merchant or other user of activities and services that may be used to enhance a visibility or usage of the merchant's account, profile, sales system or website, or the like. Chat assistant 136 may correspond to a chatbot that may be instantiated for new and/or ongoing chat sessions, such as by creating, instantiating, and/or adding the chatbot for chat assistant 136 to a chat sessions to communicate with the merchant. The communications may correspond to a dialogue or other chat text that may be exchanged between the merchant and the automated chatbot. The merchant or other user may interact with chat assistant 136 via a chat interface and chat commands, conversation, questions or requests, and other input. Such interactions may lead the merchant through onboarding and/or use of computing services, as well as populate information and processes for the activities and computing services in onboarding interfaces 114. Additionally, the merchant may be provided information for badges or incentives for the merchant to engage in and/or complete tasks or activities during onboarding or account lifecycle usage and maintenance (e.g., provide additional profile information, sign up for a service, complete a number of transactions or other activities, etc.). The operations for conversational AI provision and usage for merchant-specific recommendations during onboarding and account lifecycle maintenance are discussed in further detail with regard to FIGS. 2A-4 below.

Service applications 122 may correspond to one or more processes to execute modules and associated specialized hardware of service provider server 120 to process a transaction and/or provide other computing services to users. For example, service applications 122 may include a transaction processing application 124 used to process payments and other services to one or more users, merchants, and/or other entities for transactions, where merchants may onboard for use of transaction processing application 124 through merchant accounts and the like using MO platform 130. In this regard, the account may be used to send and receive payments, including those payments that may be enabled through the website and/or merchant application 112 after merchant onboarding. The merchant payment account may be accessed and/or used through a browser application and/or dedicated payment application executed by merchant device 110, such a payment and/or digital wallet application. Transaction processing application 124 may process payments and may provide transaction histories to merchant device 110 and/or another user's device or account for transaction authorization, approval, or denial of the transaction for placement and/or release of the funds, including transfer of the funds between accounts.

Further, service applications 122 may instead provide different computing services, including social networking, microblogging, media sharing, messaging, business and consumer platforms, etc. These computing services may be used by customers and users, such as through user devices 140, and therefore those customers and users may receive assistance through chat assistance 136 and/or other chatbots. Service applications 122 as may provide additional features to service provider server 110. For example, service applications 122 may include security applications for implementing server-side security features, programmatic client applications for interfacing with appropriate application programming interfaces (APIs) over network 140, or other types of applications. Service applications 122 may contain software programs, executable by a processor, including one or more GUIs and the like, configured to provide an interface to the user when accessing service provider server 110, where the user or other users may interact with the GUI to view and communicate information more easily. Service applications 122 may include additional connection and/or communication applications, which may be utilized to communicate information to over network 140.

Additionally, service provider server 120 includes or may access database 126. Database 126 may store various identifiers associated with merchant device 110 and/or secondary device 140. Database 126 may also store account data, including payment instruments, financial information, account balances, and authentication credentials, as well as transaction processing histories and data for processed transactions. Database 126 may include information used during merchant onboarding. Although database 126 is shown as residing on service provider server 120 as a database, in other embodiments, other types of data storage and components may be used including cloud computing storage nodes, remote data stores and database systems, distributed database systems over network 140 and/or of a computing system associated with service provider server 120, and the like.

Service provider server 120 may include at least one network interface component 128 adapted to communicate merchant device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2A:
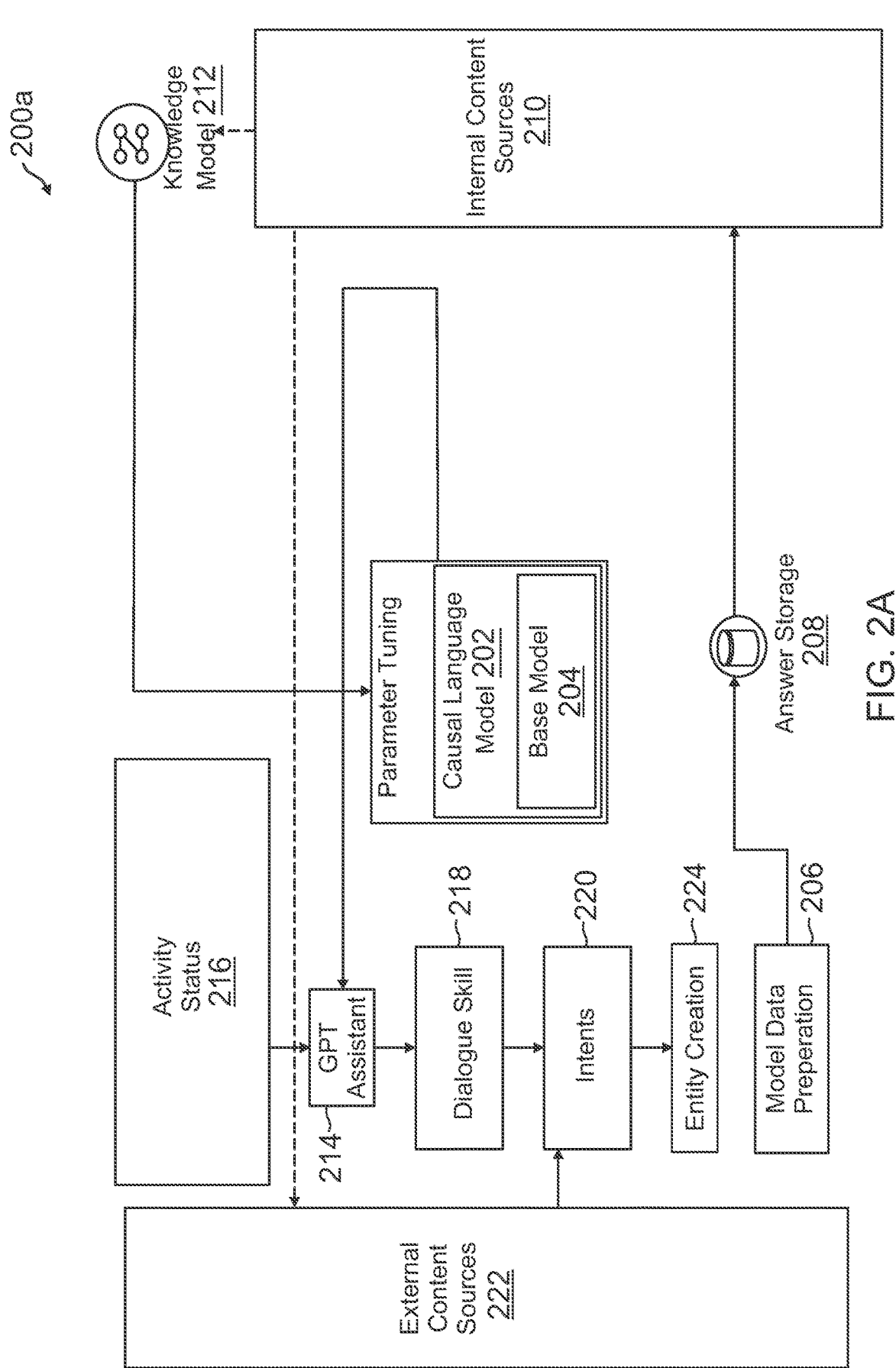
FIGS. 2A and 2B are exemplary system environments for providing a conversational AI service and personalized onboarding experience and account lifecycle based on merchant intents, according to an embodiment.
Figure 2B:
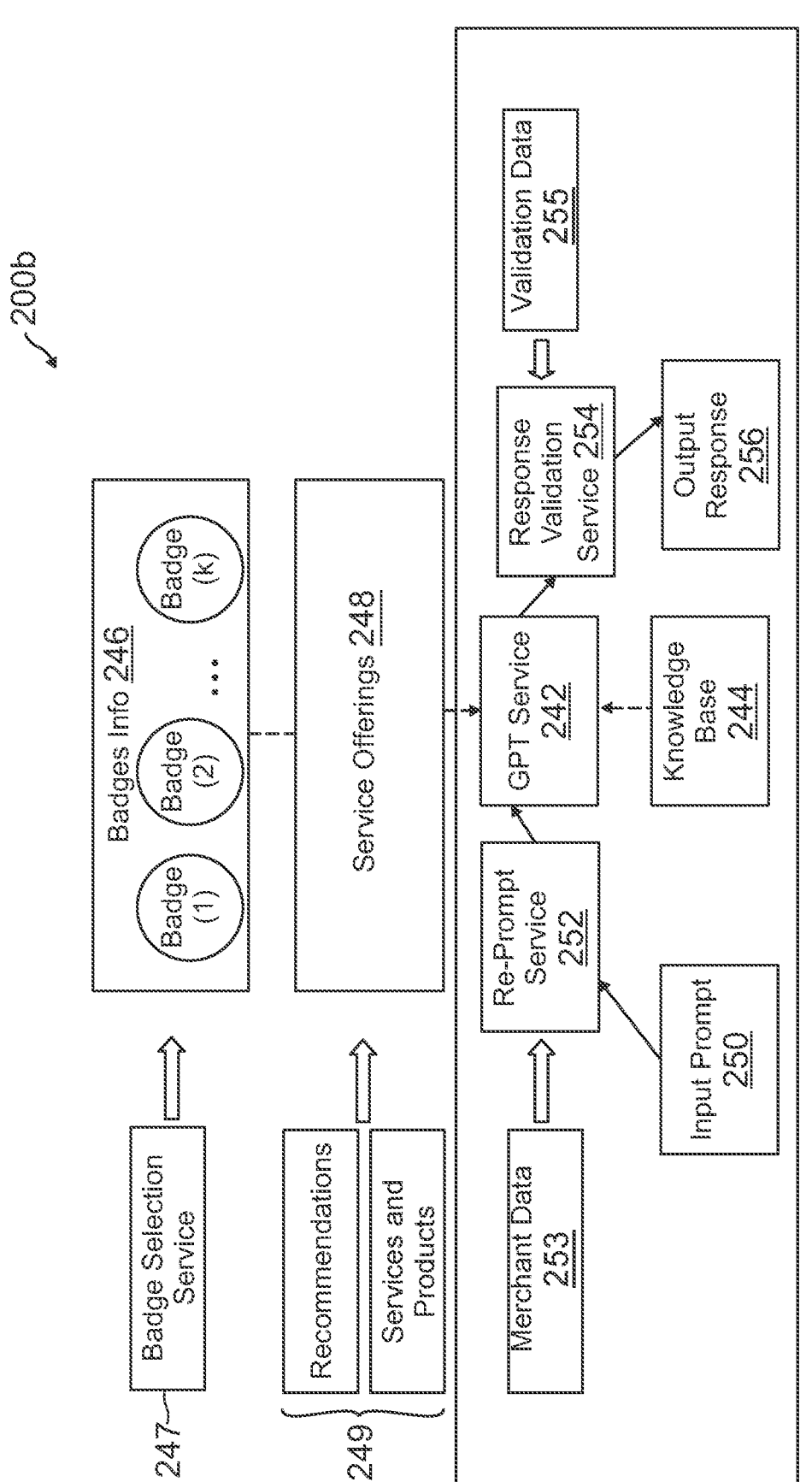

FIGS. 2A and 2B are exemplary system environments 200a and 200b for providing a conversational AI service and personalized onboarding experience and account lifecycle based on merchant intents, according to an embodiment. System environments 200a and 200b may include components of service provider server 120 that may be utilized by merchant device 110 for onboarding of a merchant account and/or use of a computing service, as discussed in reference to system 100 of FIG. 1. In this regard, system environments 200a and 200b may correspond to production computing environments and the like for MO platform 130.

Referring now to system environment 200a of FIG. 2A, an embodiment of MO platform 130 that may provide a causal language model 202 for a conversational AI is shown. Causal language model 202 may utilize a base model 204 in order to provide merchant-specific recommendations to merchants during merchant onboarding experiences and/or processing flows through a corresponding platform of the service provider. As such, causal language model 202 may correspond to an implementation of AI models 134 used for a conversational AI provided by conversational AI engine 132. Base model 204 may correspond to one of AI models trained for merchant-specific recommendations or predicted actions plans, which may be provided during or in association with a merchant onboarding for an account or computing service of a service provider.

Initially, parameter tuning of causal language model 202 may be performed to tailor causal language model 202 to conversational tasks, dialogue, and responses required for use during merchant onboarding and/or account lifecycle maintenance and events. For example, parameter tuning may include training, adjustment of weights for predictive and conversational responses or recommendations, and the like that may be specific to the service provider and/or computing services provided by the service provider that may be accessed, utilized, and/or onboarded for use via the merchant onboarding and/or during account lifecycle usage. Base model 204 may be used during the tuning and/or after to provide base recommendations, predictions, and/or decisions to merchant, such as merchant-specific recommendations for an action plan and/or recommended steps or activities to take for a specific merchant during onboarding, which may be determined based on the merchant's intent, related merchant and/or onboarding activities, and the like. As such, base model 204 may be used to provide predictive outputs of a merchant-specific predicted action plan for onboarding of an account and/or computing service (e.g., steps to take, activities to engage in, badges or rewards to offer, etc.), where causal language model 202 may generate a merchant-specific recommendation, chat notification or response, and/or conversational dialogue to engage with the merchant based on such predicted outputs.

As such, a model data preparation 206 (e.g., a preparation step or element of a process or method) may occur to train causal language model 202 and/or base model 204 using training data, which may include data preparation steps (e.g., preprocessing, cleaning, feature engineering and/or selection, etc.) to take for AI model training. For the training data and training of causal language model 202, internal data sources, frequently asked questions, and other knowledge resources may be used. For merchant intent detection, an AI model utilizing those data sources along with internally classified intents be used for training. The training data may be based on answers from an answer storage 208 that stores sources of knowledge from which a GPT, LLM, or other model may use to define a response to questions, prompts, queries, or the like. For example, answer storage 208 may include information regarding the available computing services and/or products offered by the service provider to merchants through account signup and/or usage, as well as via the various platforms, applications, websites, SDKs, and the like offered by the service provider to merchants, customers, and other users. In this regard, answer storage 208 may be used to recommend to merchants or other users services or products that may assist based on correspond intents, historical onboarding data or activities, and the like. Answer storage 208 may also include troubleshooting information and other assistance information, which may serve as a basis to a chat assistance to provide help for issues occurring during onboarding.

Internal content sources 210 may also be used to provide additional training data regarding the service provider that may be used to assist the merchant during onboarding and/or with an account, including business processes, complaint or grievance frequently asked questions (FAQ) or other assistance, content from enterprise systems, and the like. A knowledge module 212 (human or computer, including AI models and engines) may be used to curate, annotate, and/or otherwise adjust and configure the training data, which may then be input to the parameter tuning for causal language model 202 and/or base model 204. As such, causal language model 202 and/or base model 204 may be tuned to be specific to the onboarding process and/or chat assistance provided to merchants or other users for the service provider.

Once tuned, causal language model 202 with base model 204 may be deployed with a GPT assistant 214, such as a ChatGPT AI or other conversational AI, which may be tuned specifically for the onboarding process and/or account lifecycle maintenance with the service provider. When GPT assistant 214 responds to merchants or other users, such as when onboarding of merchants, merchant-specific recommendations may be provided based on an activity status 216 of the merchants or other users. For example, activity status 216 may be determined based on a merchant intent and/or journey with the service provider. A merchant intent may be determined based on the merchant's data (e.g., business information, business goals, merchant category, sales and/or transaction volume, size, customers, etc.), past merchant activities, chats with real agents or chatbots, and similar data from other merchants that share one or more of the same or similar traits, such as business type, size, revenue, location, customer base, types of offerings (products and/or services), and the like, where the journey of the merchant may correspond to the path of interactions by the merchant with the service provider and the service provider's products and/or services. As such, activity status 216 may further be used to configure and provide outputs by GPT assistant 214.

When configuring GPT assistant 214, a dialogue skill 218 may be associated with the system to provide chat dialogue interactions, responses, outreach, recommendations, and the like. Dialogue skill 218 may be used to provide base chat dialogue with merchants or users. As such, dialogue skill 218 may correspond to conversational ability of GPT assistant 214, such as the skill and capability to respond in a human-like manner. For additional responses, intents 220. Intents 220 may correspond to classifications of domains/topics/conversation that help GPT assistant 214 concentrate on more focused areas of a knowledge base by informing GPT assistant 214 that the conversation/query initiated by the user is related to a specific topic/entity/intent. Intents 220 may include merchant intent examples, which may be used to intent identification and classification during merchant interactions with the conversational AI for GPT assistant 214. Intents 220 may be generated using external content sources, which may include open and third-party sources, multimedia content, social data socials, and/or terms, conditions, and/or limitations on usage of corresponding services, products, accounts, or the like. Entity creation 224 may further be performed in order to provide entity-based responses and other information for certain entities that may interact with and/or be provided in responses by GPT assistant 214.

Referring now to system environment 200b of FIG. 2B, an embodiment of MO platform 130 where a conversational AI service, such as a computing service for conversational AI engine 132 on MO platform 130, may be shown that provides an output response for a merchant-specific recommendation. Such merchant-specific recommendations (e.g., predicted action plans, activities or steps to perform, products/services of interest, etc.) may be provided during onboarding and/or after onboarding for account services and/or products, as well as account lifecycle events, based on a merchant intent classified and/or determined from merchant data, activities, chat dialogues, and the like. A GPT service 242, such as a computing service providing GPT assistant 214, that relies on a knowledge base 244 to provide a conversational AI to merchants may be used during merchant onboarding and/or other account lifecycle events. As such, GPT service 242 may be used to assist merchants with onboarding, such as by generating merchant-specific recommendations based on merchant intents that may be presented to the merchant during onboarding and/or via a user interface for the onboarding or account usage.

Knowledge base 244 may be associated with data and resources used for onboarding of merchants and/or to provide account and other computing services to merchants. As such, knowledge base 244 may be associated with a service provider and may include information associated with account onboarding steps, activities, troubleshooting, and the like. Additionally, badges information 246 may include information about different badges that may be earned or rewarded to merchants for activities taken during onboarding and/or with an account. As such, badges information 246 may be used to advertise and/or reward badges that are specific to merchants for incentivizing and completing tasks or activities, which may assist with onboarding and/or engagement with merchants. Badges information 246 may be obtained from a badge selection service 247, which may provide and/or be used to request data for different badges, as well as award badges to accounts.

GPT service 242 may also utilize service offerings 248 when providing merchant-specific recommendations, which may correspond to the computing services and products offered by the service provider to merchants through onboarding and/or account usage. Service offerings 248 may correspond to catalogs and corresponding guides, information sources, and the like that may assist with usage of, advertisement for, and/or onboarding with computing services available from the service provider. Service offerings 248 may include service and product data 249 from recommendations, pricing, awards, cross-selling, and the like for the computing services and products offered by the service provider.

As such, GPT service 242 may provide a conversational AI based on knowledge base 244, badges information 246, and service offerings 248. An input prompt 250 may be received for the conversational AI, which may correspond to a request and/or information associated with a merchant onboarding request or detected initiation and corresponding merchant intent. As such, a merchant may onboard with the online transaction processor and establish an identity and/or verification of the merchant's data, validity, nonfraudulent behavior, or the like. For example, the merchant may provide a merchant identifier, know your customer (KYC) information (e.g., name, address, merchant or user documents (passport, national identifier, social security number, etc.), an employer identification number (EIN) or other tax information, or other identification information. To initiate GPT service 242, a service re-prompt 252 may initiate GPT service 242 based on merchant data 253, such as a conversational intent and/or merchant forecast or scores. Service re-prompt 242 may clean, modify, and/or rephrase the input text so that it resembles a format in the way GPT service 242 was trained, which may include transforming to a more constructive query than that of the end users query.

After processing using an AI engine and trained models, such as causal language model 202 that may utilize base model 204, an output may be provided to the merchant during onboarding. In this regard, a response may be formulated as a conversational dialogue that may provide a merchant-specific recommendation to the merchant. A response validation service 254 may be used to validate the response, which may utilize validation data 255 including internal content sources, eligibility terms of services, products, and/or offers, and/or insights and trends to service and product usage. Once GPT service 242 responds, it may be required that the response is validated, cleaned, and tested so that the adheres to certain protocols, guardrails, and standards set by the service provider or other organization onboarding the merchant. This may be done to ensure that a response given by GPT service 242 is not just sent out when created or determined, but also that the response validated in an automated way. As such, validation data 255 may further be used to tailor or adjust the recommendation by response validation service 254. Thereafter, an output response 256 may be provided to the merchant, which may correspond to the merchant-specific recommendation provided via a chat, dialogue, or the like, notification or message in a user interface, or the like that may be provided during an onboarding or account lifecycle event.

FIGS. 3A-3E are exemplary user interfaces 300a-300e for a conversational AI and chat assistant that provides personalized recommendations to merchants during account onboarding and lifecycle events, according to various embodiments. User interfaces 300a-300e may be presented to a user on a user device, such as onboarding interfaces 114 on merchant device 110 in system 100 of FIG. 1, based on use of MO platform 130 of service provider server 120 for onboarding of a merchant with an account and/or computing service. As such, user interfaces 300a-300e may include recommendations and/or predicted action plans for steps and/or activities for a merchant to take, which may include text, graphics, badges, chat assistance, and the like, provided by conversational AI engine 132.

Figure 3A:
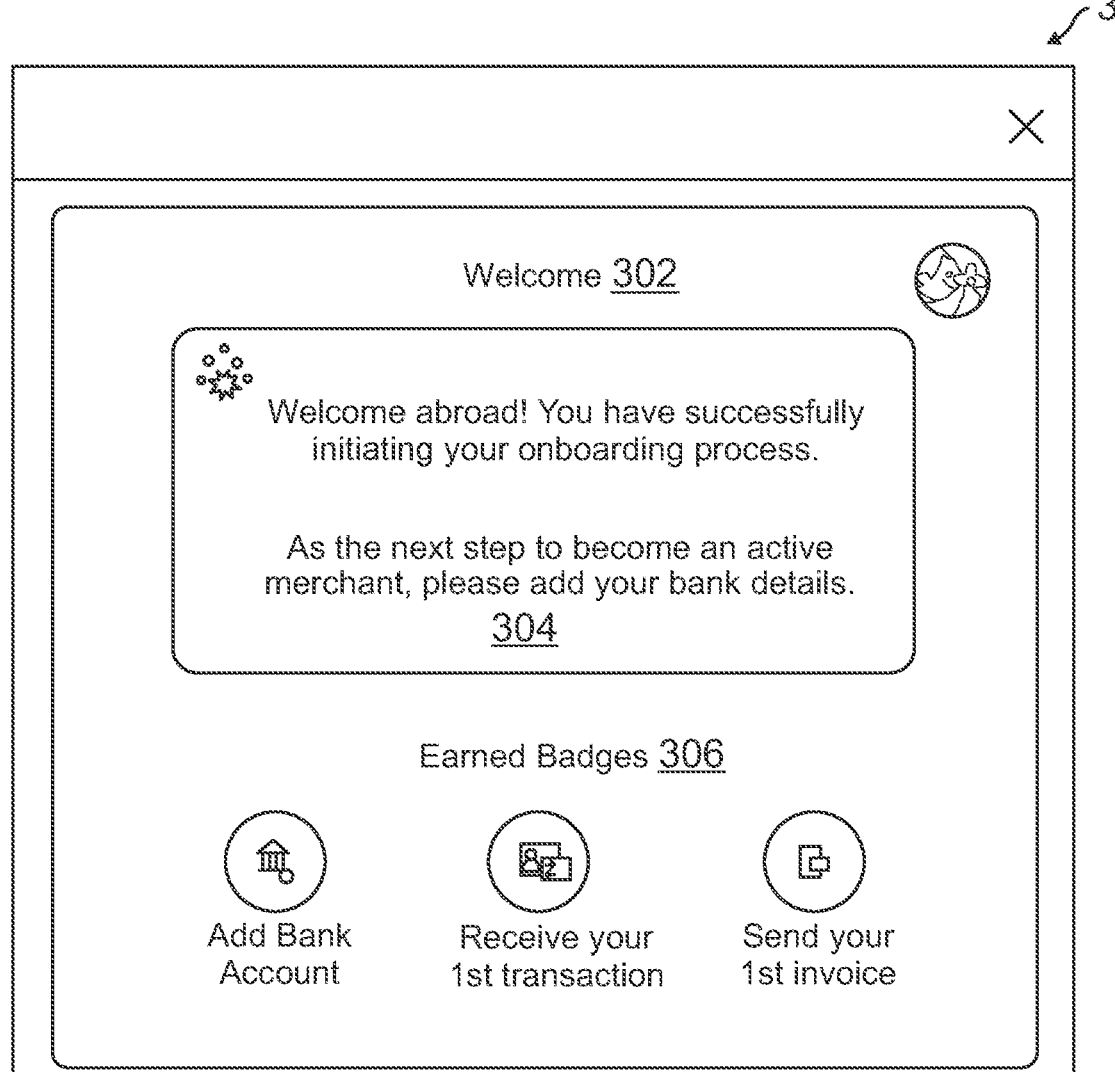

Referring now to user interface 300a of FIG. 3A, initially a user may access a conversational AI 302 for an onboarding experience with a service provider system, such as MO platform 130 of service provider server 120 in system 100. As such, a notification 304 may greet the merchant and may indicate to the merchant that additional steps and/or activities may be required in order to onboard for the merchant's account and/or computing service. In conversational AI 302, notification 304 may indicate that the merchant is required to provide bank details in order to become an active merchant, thereby authorizing the merchant to process transactions and/or send/receive money or other funds from other users (e.g., customers, other merchants, employees, vendors, etc.). Notification 304 may include text generated by a conversational AI, such as a generative pretrained transformer, LLM, or the like (e.g., by AI models 134 of conversational AI engine 132), which may be generated based on the merchant's intent to send/receive funds for transactions. Further, to incentivize the merchant to complete the steps and/or activities in notification 304, badges 306 display that a merchant may earn certain badges by adding a bank account, receiving a first transaction, and/or sending a first invoice.

Figure 3B:
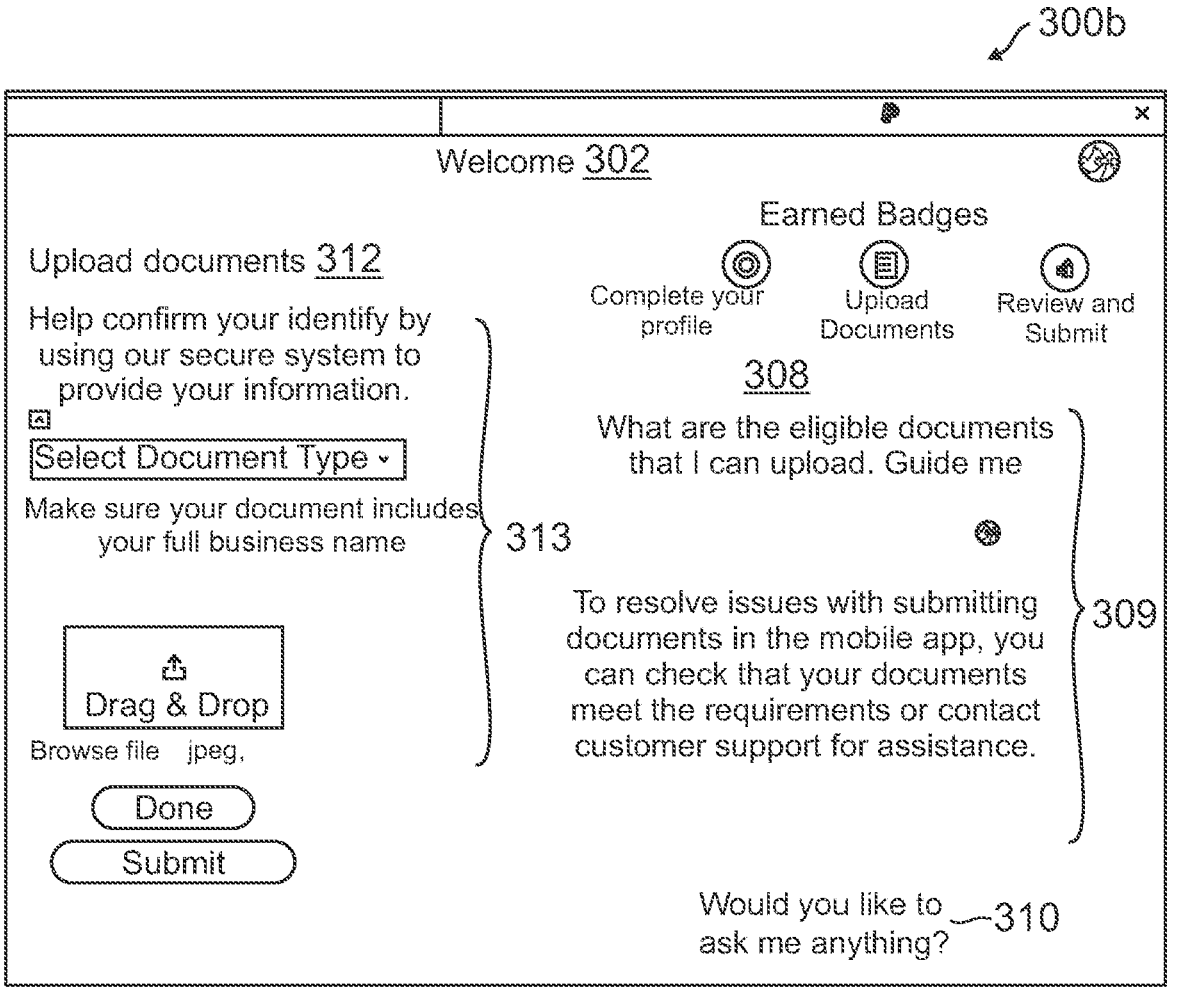

Referring now to FIG. 3B, in user interface 300b, conversational AI 302 may further provide details during the merchant's onboarding experience to complete the task assigned to the merchant in user interface 300a. For example, in user interface 300a, the merchant may be guided to provide bank and/or merchant business information in order to properly onboard for an active merchant account to send and/or receive funds, such as during electronic transaction processing. As such, the merchant may attempt to upload documents for a merchant tax and/or employer identification number that may be used for payment processing and/or merchant validation and verification (e.g., verification of the merchant's business). This process may be based on completing actions and earning one or more of badges 306 from user interface 300a.

In order to assist the merchant with the onboarding experience, a chat interface 308 or another window or field within user interface 300b may be presented to the merchant for a chat assistant that utilizes the conversational AI to provide automated chatbot responses and interactions with the merchant. In chat interface 308, a chat dialogue 309 shows a question by the merchant on the proper uploading and submission process for merchant business information or documents. The chat assistant may respond in chat interface 308 with information using a generative pretrained transformer (e.g., ChatGPT), LLM, or the like to provide conversational responses that guide the user. The chat assistant may be trained on the available services, operations of such services, and other proprietary information and computing systems of the service provider in addition to chat features. The chat assistant may further be trained to respond to the merchant's intent when requesting the assistance and completing the task, such as the intent that may be parsed and intelligently predicted or classified from the merchant data, previous actions or activities when onboarding (e.g., onboarding journey or experience), and/or the current chat request and communications in chat interface 308. Chat interface 308 further includes a query field 310 where the merchant may ask further questions to the chat assistant, which may be processed using conversational AI 302. Such text in chat interface 308, including chat dialogues 309 and further input via query field 310, may be parsed and processed for semantics and meaning, which may be utilized in the intent classification.

In this regard, the intent for the merchant may be classified for completing a profile badge and/or activity by uploading merchant business verification documents, which may lead to presentation of additional interface options, fields, and processes that are available with computing services of the service provider. In order to assist with proper document uploading, the conversational AI engine or platform may further present the corresponding computing service and/or operations being requested by the merchant, such as a document upload process 312 having document upload fields 313. In document upload process 312, the merchant may be provided with document upload fields 313 to submit the requested documents used to verify the merchant's business, tax information, bank information, or the like for account profile completion.

Referring now to FIG. 3C, in user interface 300c, conversational AI 302 may be further used by the merchant during onboarding and/or account lifecycle after the merchant has provided initial account information. For example, user interface 300c may present information to the merchant during or after onboarding that is associated with transaction processing and/or limitations on transaction processing. The merchant may be attempting to request money from a customer or another payer, such as when the merchant is acting as a payee in a transaction or monetary transfer. This may occur after a merchant has completed their profile and/or added a bank account, where badges 306 may be updated to reflect that the merchant now has added a bank account and earned the corresponding badge.

However, the merchant may be limited on an amount of funds that the merchant is capable of requesting. As such, conversational AI 302 may be utilized to assist the merchant in discovering information about the transaction processing service or product provided by the service provider (e.g., an online transaction processor for payment processing, such as PayPal®). For example, the merchant may inquire in a chat interface 314 about limitations on requesting money from other users, as shown in a chat dialogue 315. Chat dialogue 315 shows a reply from conversational AI 302 based on the inquiry and other information indicating the merchant's intent (e.g., to request money from another user or entity, which may be an amount up to a cap). With the reply, conversational AI 302 may populate a request money process 316 in user interface 300c, where the merchant may then proceed to add a name, username/tag, email address, phone number, or the like of one or more users. This may allow the merchant to quickly access the request money computing service of the service provider.

Figures 3D, 3E:
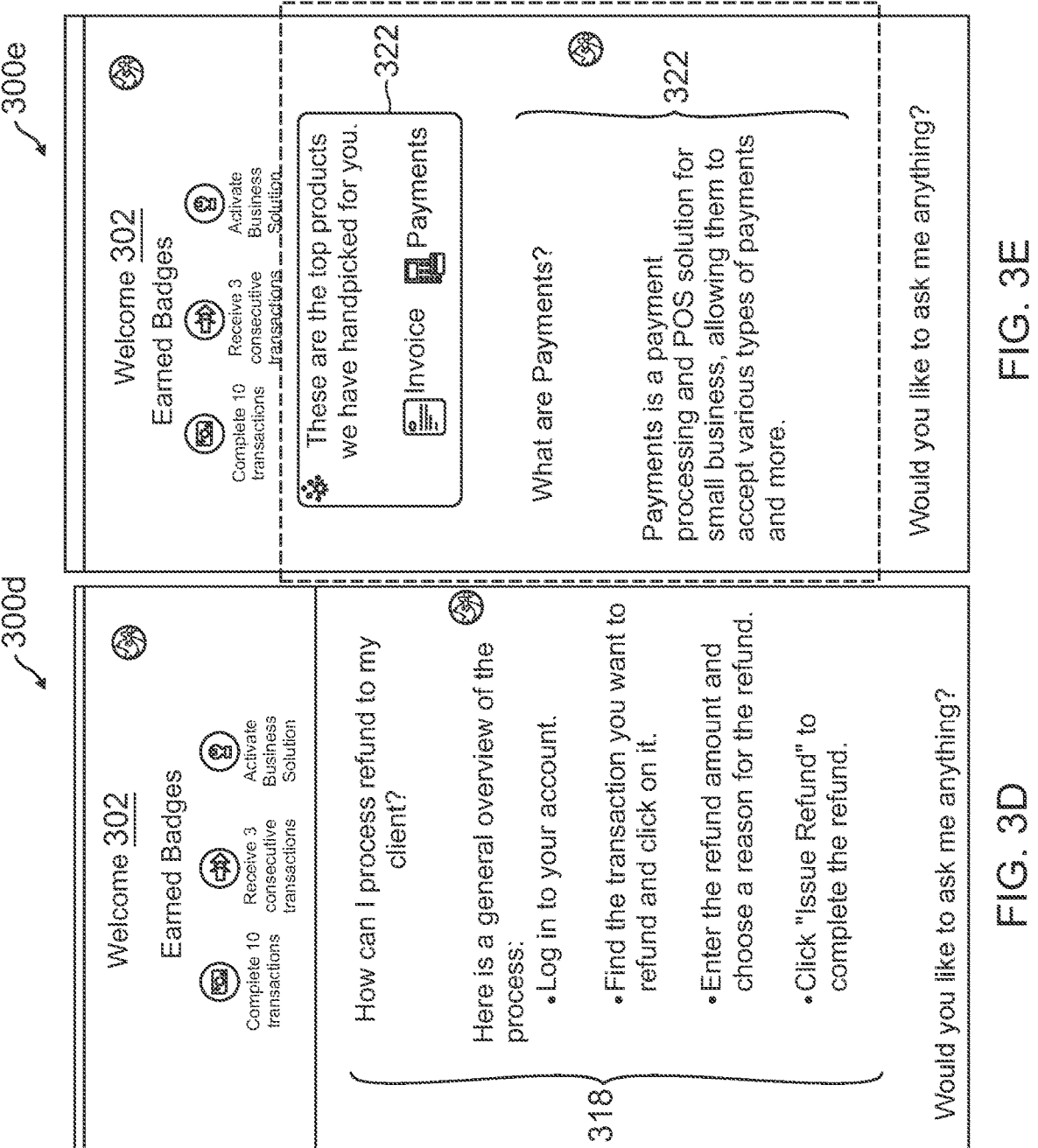

Referring now to FIG. 3D, in user interface 300d, the merchant may inquire conversational AI 302 on the usage of a computing service, such as a refund service for processing refunds to users. User interface 300d may be presented during merchant account onboarding and/or during account lifecycle events, such as management of the account with refunds processed to customers. In this regard, badges 306 may be updated to show that the merchant has now processed at least 10 transactions and earned the corresponding badge. In user interface 300d, the merchant may have requested the information from conversational AI 302 for refund processing and fees in a chat dialogue 318. A merchant intent may be determined and/or updated based on further merchant data, activities, and/or communications or chats with conversational AI 302 that have occurred during or since onboarding. As such, when responding in chat dialogue 318 to the merchant, conversational AI 302 may provide a list of steps or activities to take to effectuate the proper return, which may be based on the computing services of the service provider.

Referring now to FIG. 3E, in user interface 300e, the merchant may inquire about a computing service and product of the service provider in a chat dialogue 320 from conversational AI 302. The service and product may be related to a payment processing and POS solution, where conversational AI 302 may respond with information regarding this offering by the service provider. Thus, conversational AI 302 may provide and populate information that may answer the merchant's question based on the available computing services and products of the service provider, which may be learned from available data for such services and products. Population of available computing services and/or products of the service provider may be based on the merchant's data, intent, and/or merchant-specific recommendations that may best serve to enhance or improve the merchant's profile, visibility, and/or account availability for the activities that the merchant has or is predicted to engage in with customers. Thus, offers 322 may display an option for the merchant to access an invoicing system and the requested product.

FIG. 4 is a flowchart 400 for a conversational AI service and chat assistant for personalized entity onboarding with digital platforms, according to an embodiment. Note that one or more steps, processes, and methods described herein of flowchart 400 may be omitted, performed in a different sequence, or combined as desired or appropriate.

At step 402 of flowchart 400, it is detected that a merchant is engaged in an onboarding flow for an account or service provided by a service provider. For example, in system 100 of FIG. 1, merchant device 110 may be used to engage in an onboarding for a merchant account and/or use of a computing service provided by service provider server 120 through the use of MO platform 130 of service provider server 120. Detection of the onboarding may occur when the merchant initiates a sign-up or request for establishment of a merchant account, or may occur after the merchant account is activated and used where the merchant may request use of further services from service provider server 120. During the onboarding, the merchant may perform activities, engage in chats with automated chatbot and/or live chat agents, and/or otherwise provide merchant data that indicates the merchant's intent in onboarding and/or use of computing services provided by service provider server 120. Further, the merchant data may include information about the merchant's business, customers, products or services for sale, merchant category, size or volume of transactions and payments, geographic location, and the like, which may further indicate the merchant's intent. In some embodiments, when the merchant is engaging in the onboarding flow, a chat assistant (e.g., chat assistant 136), may be created, instantiated, and/or joined to a chat session for conversing with the merchant, such as to provide merchant specific recommendations.

At step 404, merchant data for the merchant and interaction data for a past activity and/or current chat session of the merchant is determined. In this regard, during use of MO platform 130 by merchant device 110, the merchant data may be received and/or collected from merchant device 110 and/or the merchant. This may include input of merchant sales, business, company, customer, or other information, as well as past activities of the merchant that may be associated with the merchant's business or sales. Further, past and/or current activities and/or interactions, including chat session dialogue or conversations with live agents or chatbots, may be monitored, aggregated, and/or tracked over different platforms and applications of service provider server 120 that the merchant and/or similar merchants use.

At step 406, an intent of the merchant with the onboarding is classified. AI models 134 may be used to process the merchant data and interaction data for past and/or current activities of the merchant and/or similar merchants in association with the onboarding. Processing such data by AI models 134 may result in an output prediction, classification, or the like of the merchant's intent in performing the onboarding and/or utilizing the account and/or computing services provided by service provider server 120. For example, conversational AI engine 132 may generate predictions of intents that may be used with a generational and/or conversational AI, such as a generative pretrained transformer and/or LLM, to generate conversational dialogue, recommendations, action plans, and/or additional activities that may be provided, outputted, and/or recommended to the merchant. As such, the intent of the merchant may be determined by AI engines 134, such as using an ML model that processes input features to provide an output classification of the merchant's intent, to designate a desired outcome and/or usage of the account and/or service that the user is onboarding for when engaging with MO platform 130.

At step 408, a merchant-specific recommendation is predicted. Conversational AI engine 132 may utilize the generative pretrained transformer, LLM, or other conversational AI model and/or process to generate a recommendation that provides an action plan where the merchant may take additional steps, engaging in further actions, or otherwise perform certain tasks that are recommended to the merchant based on the merchant's intent. This includes other computing services of the service provider that may be of interest to the merchant and/or may increase, improve, or enhance the merchant's account, merchant's sales or transaction processing systems, and/or merchant's profile or profile visibility with the service provider and/or with customers of the merchant.

At step 410, the merchant-specific recommendation is displayed and an operation for interaction during the onboarding is provided. In this regard, a user interface of MO platform 130 may be presented to the merchant in merchant application 112, such as one of onboarding interfaces 114, which may display the merchant-specific recommendation, such as one having a personalized action plan and/or activities for the merchant to engage in during or after the onboarding for the merchant's account. At step 412, a chat assistant is provided to the merchant that responds to the user, provides recommendations, and guides the merchant through the onboarding flow based on the intent of the merchant. For example, a chat assistant may correspond to a chatbot that utilizes a conversational AI engine/system to converse with different users, such as the merchant, in a conversational manner and provide different assistance including the merchant-specific recommendation and/or guidance through the onboarding flow. With the recommendation and/or action plan, a chat interface for chat assistant 136 or other conversational AI may be presented in the interface. This may include instantiating chat assistant 136 for conversing with the merchant and/or using an existing instance or execution of chat assistant 136 that has been created, instantiated, and/or joined to a chat session for conversing with the merchant. The chat assistant may allow the merchant to converse with the conversational AI in order to request assistance, complete onboarding tasks, and/or navigate through interfaces and services of the service provider.

The chat interface may allow the merchant to communicate with the chat assistant through include chat communications, queries, responses, and the like. The chat assistant may intelligently guide the user with the merchant-specific recommendation, including tasks to complete, badges that may be earned, and/or responses to questions by the merchant. Further, the conversational AI of the chat assistant may be used to response to other questions and requests from the merchant, such as information on different products and services available to the merchant with the service provider. The conversational AI may utilize LLMs, GPTs, and/or other models or NNs that allow conversing in a human-like manner through automated chatbot responses. Moreover, with the conversational AI and/or in the user interfaces, the service provider may present badges, rewards, or other incentives that may be earned or rewarded for the merchant completing certain tasks, achieving milestones or goals during onboarding or account use, and the like, which may be used to incentivize the merchant to complete the recommended activities or other activities and/or engage in uses of certain computing services and products provided by the service provider.

Figure 5:
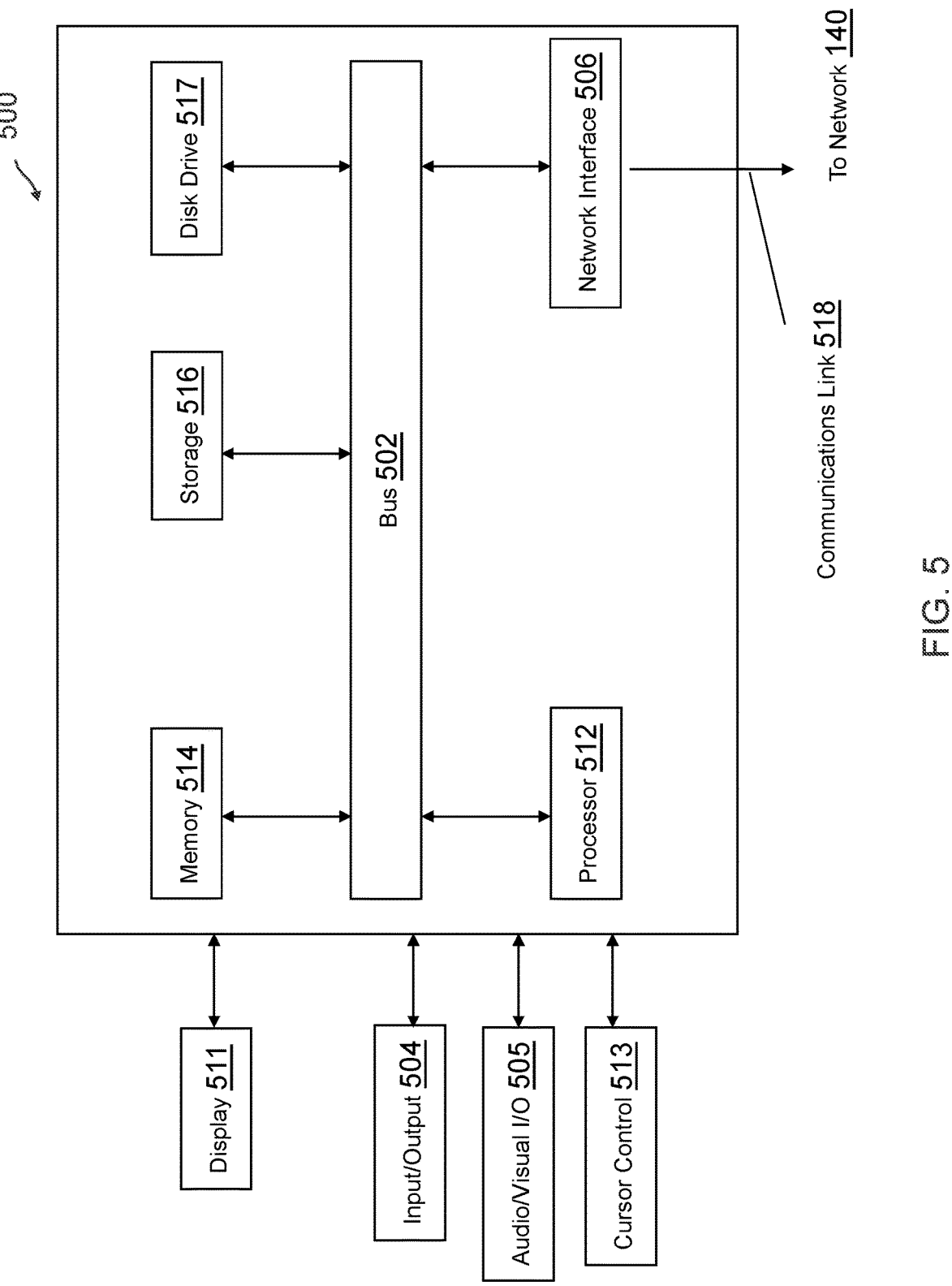
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output component 505 may also be included to allow a user to use voice for inputting information by converting audio signals and/or use video to capture still or video images and provide video input. Audio I/O component 505 may allow the user to hear audio and/or view video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:

a non-transitory memory; and one or more hardware processors coupled to the non-transitory memory and configured to read instructions from the non-transitory memory to cause the service provider system to perform operations comprising:

determining that a merchant is performing an onboarding for a merchant account with the service provider system, wherein the onboarding registers the merchant for at least one of the merchant account or a computing service provided by the service provider system via the merchant account;

determining, for the merchant, merchant data associated with a set of merchant onboarding features for a conversational artificial intelligence (AI) engine trained for personalized assistance responses based on computing services provided by the service provider system, wherein the merchant data is associated with at least a business of the merchant;

extracting context data associated with the onboarding from the merchant data, wherein the context data is associated with one or more past activities of the merchant or other merchants;

classifying, using the conversational AI engine based on the context data, an intent of the merchant during the onboarding;

predicting, using the conversational AI engine and based on the intent, a personalized action plan for the onboarding of the merchant, wherein the personalized action plan includes one or more steps for the merchant to perform during or after the onboarding for the merchant account and an additional activity for the merchant to perform in association with the onboarding;

generating a configuration of an AI chat assistant that includes a dialogue skill associated with the personalized action plan;

causing to be displayed, to the merchant during the onboarding, a user interface including the personalized action plan with a chat interface configured to provide the AI chat assistant for the conversational AI engine based at least on the configuration, wherein the user interface includes a visualization of the one or more steps of the personalized action plan and an operation for the merchant to engage in the additional activity using at least the chat interface with the AI chat assistant;

providing one or more topics associated with the onboarding using the AI chat assistant based on the intent; and causing the AI chat assistant to converse with a merchant agent of the merchant regarding the personalized action plan during the onboarding based on the dialogue skill and the one or more topics.

2. The service provider system of claim 1, wherein the conversational AI engine comprises a generative pretrained transformer trained for the service provider system for the personalized assistance responses, and wherein the generative pretrained transformer is integrated with at least one large language model (LLM) that processes prompts from the generative pretrained transformer that are associated with at least one of the intent of the merchant, a query input by the merchant, or a goal of the merchant.

3. The service provider system of claim 1, wherein the one or more steps for the personalized action plan comprise one or more account actions available to the merchant recommended to improve at least one of a usage or a visibility of the merchant account.

4. The service provider system of claim 1, wherein the classifying the intent comprises:

parsing text input provided by the merchant to the AI chat assistant during the onboarding;

determining at least a portion of the merchant data that is associated with at least one of a profile of the merchant, the context data, or a progress of the merchant with the onboarding; and performing an intent determination of the intent of the merchant for the onboarding based on the parsed text input and the determined at least the portion of the merchant data.

5. The service provider system of claim 1, wherein the operations further comprise:

receiving one of an interaction with the personalized action plan or a chat message to the AI chat assistant via the chat interface;

determining, using the conversational AI engine, a sentiment analysis of the merchant with the onboarding based on the one of the interaction or the chat message;

generating a chat response to the one of the interaction or the chat message based on the sentiment analysis; and outputting the chat response via the chat interface using the AI chat assistant.

6. The service provider system of claim 1, wherein the predicting the personalized action plan includes determining a reward offered to incentivize the merchant to perform the additional activity during the onboarding based on at least one of a merchant-specific interest of the merchant or an industry-specific guidance for the business of the merchant.

7. The service provider system of claim 1, wherein, before the onboarding of the merchant, the operations further comprise:

training at least one AI model for the conversational AI engine to generate the personalized assistance responses using training data associated with the computing services, the rewards, and past merchant onboarding experience data; and configuring the conversational AI engine with the at least one trained AI model and a natural language processor including a sentiment analyzer, an entity recognition module, and an intent classifier.

8. The service provider system of claim 1, wherein the operations further comprise:

providing at least one progress completion badge to the merchant during the onboarding, wherein the at least one progress completion badge identifies a progress to a goal achievable by the merchant for at least one of the personalized action plan or another personalized action plan.

9. The service provider system of claim 8, wherein the at least one progress completion badge provides a metric that allows the merchant or a service employee of the service provider system to determine a number of events or an amount of time completed in the progress to the goal, and wherein the at least one progress completion badge is shareable using a merchant profile for the merchant with the merchant account.

10. The service provider system of claim 1, wherein the context data is extracted based on at least one of a pre-context of the merchant provided when initiating the onboarding for the merchant account, one or more queries provided by the merchant, or one or more merchant goals provided by the merchant for use of the merchant account.

11. The service provider system of claim 1, wherein the personalized action plan is dynamic and merchant-specific based on the context data including a current context associated with the onboarding or a use of the merchant account after the onboarding, and wherein the operations further comprise:

predicting, using the conversational AI engine based on a chat session by the merchant with the AI chat assistant, a next context of the merchant; and dynamically adjusting the personalized action plan based on the next context.

12. A method comprising:

detecting a merchant entering an account servicing system for a merchant account of the merchant with a service provider system, wherein the account servicing system enables the merchant to view available computing services of the service provider system and converse with an artificial intelligence (AI) chat assistant associated with a conversational AI engine trained for personalized assistance responses based on the available computing services provided by the service provider system;

determining, for the merchant, a merchant intent for the merchant based on a set of merchant account features for the conversational AI engine, wherein the set of merchant account features is associated with at least a business of the merchant and a context associated with requesting usage of the available computing services by the merchant with the merchant account;

generating, based on the merchant intent, a prediction of a personalized action plan for an activity available to the merchant via the merchant account that utilizes one of the available computing services;

generating a configuration of the AI chat assistant that includes a dialogue skill associated with the personalized action plan based on the merchant intent;

causing to be displayed, to the merchant via a user interface of the account servicing system, the personalized action plan with a chat interface configured to provide the AI chat assistant for the conversational AI engine, wherein the user interface includes an interface element enabling the merchant to interact with at least one of the personalized action plan or the one of the available computing services;

outputting, via the chat interface using the AI chat assistant and based on the configuration, a notification to the merchant associated with the personalized action plan;

providing one or more topics associated with the available computing services using the AI chat assistant based on the merchant intent; and conversing with the merchant about the personalized action plan using the AI chat assistant based on the dialogue skill and the one or more topics.

13. The method of claim 12, further comprising:

receiving an assistance request via the chat interface; and outputting a response to the assistance request in the chat interface using the conversational AI engine.

14. The method of claim 13, wherein the response is based on one of the available computing services provided by the service provider system, and wherein the response includes information on usage of the available computing services that is specific to at least one of the merchant or the personalized action plan.

15. The method of claim 13, wherein the response is further based on a current process being utilized by the merchant in the user interface.

16. The method of claim 12, wherein the merchant intent is further based on a set of previous activities engaged in by the merchant with the service provider system.

17. A non-transitory machine-readable medium having stored thereon machine-readable instructions executable to cause a machine to perform operations comprising:

determining that a merchant is performing an onboarding for a merchant account with a service provider system, wherein the onboarding registers the merchant for at least one of the merchant account or a computing service provided by the service provider system via the merchant account;

determining, for the merchant, merchant data associated with a set of merchant onboarding features for a conversational artificial intelligence (AI) engine trained for personalized assistance responses based on computing services provided by the service provider system, wherein the merchant data is associated with at least a business of the merchant;

classifying, using the conversational AI engine, an intent of the merchant during the onboarding;

predicting, using the conversational AI engine and based on the intent, a personalized action plan for the onboarding of the merchant, wherein the personalized action plan includes one or more steps for the merchant to perform during or after the onboarding for the merchant account and an additional activity for the merchant to perform in association with the onboarding;

generating a configuration of an AI chat assistant that includes a dialogue skill associated with the personalized action plan; and causing to be displayed, based on the personalized action plan and the configuration, a user interface including the personalized action plan and a chat interface configured to provide the AI chat assistant to the merchant during the onboarding.

18. The non-transitory machine-readable medium of claim 17, wherein the operations further comprise:

extracting context data associated with the onboarding from the merchant data, wherein the context data is associated with one or more past activities of the merchant in association with the onboarding, wherein the classifying the intent of the merchant is based on the context data.

19. The non-transitory machine-readable medium of claim 17, wherein the user interface includes a visualization of the one or more steps of the personalized action plan and an operation for the merchant to engage in the additional activity using at least the chat interface with the AI chat assistant.

20. The non-transitory machine-readable medium of claim 17, wherein the conversational AI engine comprises a generative pretrained transformer trained for the service provider system for the personalized assistance responses, and wherein the generative pretrained transformer is integrated with at least one large language model (LLM) that processes prompts from the generative pretrained transformer that are associated with at least one of the intent of the merchant, a query input by the merchant, or a goal of the merchant.

* * * * *